Nov. 15, 1955           G. PRALL           2,723,585
ANTI-THEFT DEVICE FOR AUTOMOBILE HUB CAPS
Filed Feb. 9, 1953
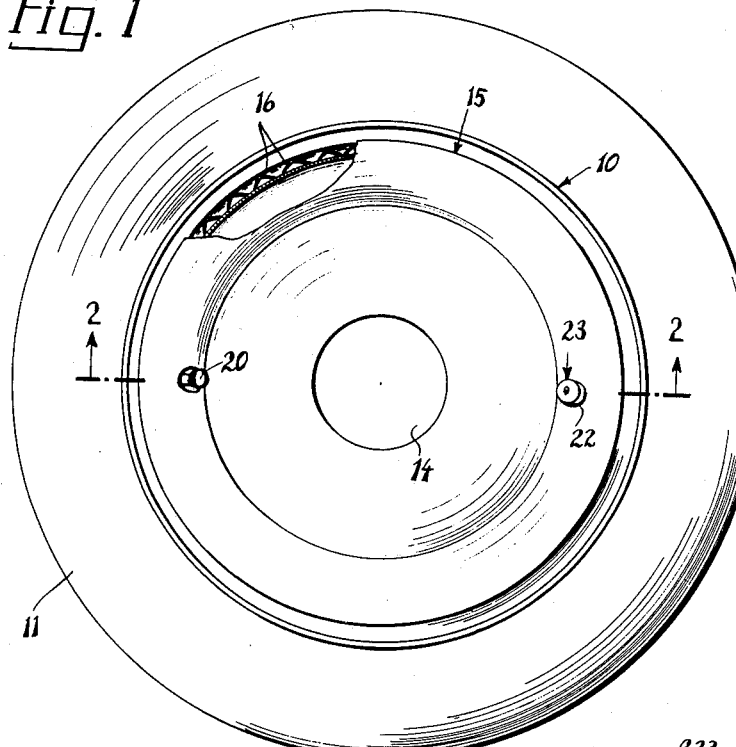
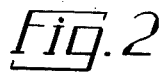
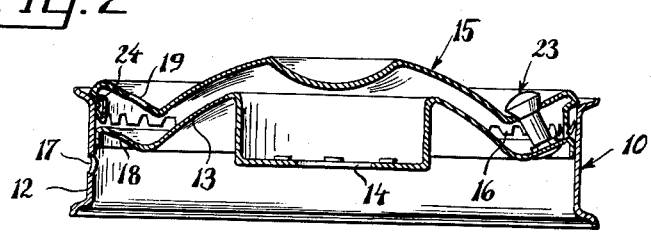
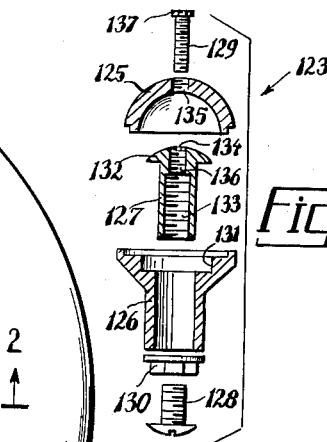
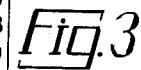
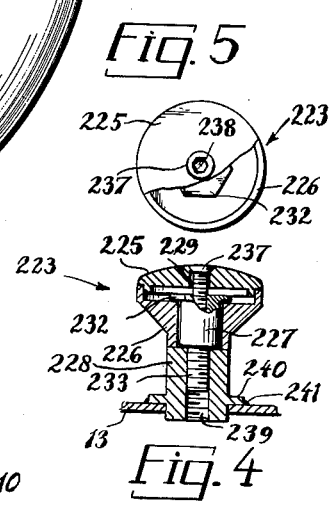
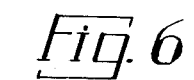
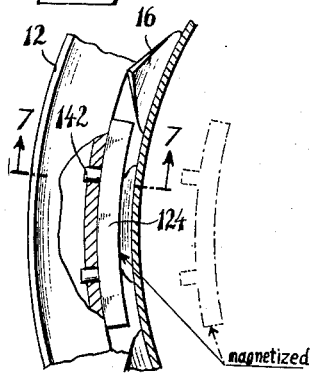
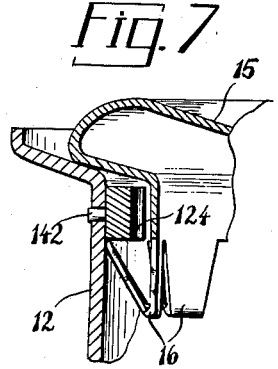
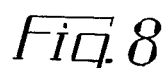
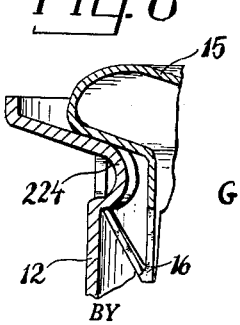
GUSTAV PRALL
INVENTOR.
BY Karl F. Ross
AGENT United States Patent Office 2,723,585
Patented Nov. 15, 1955

2,723,585
ANTI-THEFT DEVICE FOR AUTOMOBILE HUB CAPS

Gustav Prall, New York, N. Y.

Application February 9, 1953, Serial No. 335,880

12 Claims. (Cl. 85—32)

My present invention relates to automobile hub caps, in particular to the more recently introduced large-size, ornamental hub caps designed to cover substantially the entire face of the tire-carrying wheel.

The general object of this invention is to provide means for effectively preventing the theft of these relatively expensive hub caps by making their removal from the wheel discouragingly difficult for anyone except authorized persons familiar with the particular vehicle involved.

A more specific object of the invention is to provide a versatile locking device for hub caps which may be executed in a variety of forms without giving the casual observer a clue to their particular construction, thereby baffling a would-be thief not equipped with the right combination of tools required for their unlocking.

It is also an object of the instant invention to provide inexpensive locking means of the aforedescribed character adapted to be readily secured to the vehicle even where the latter is equipped with wheels of conventional type.

In accordance with a feature of the invention there is provided a retaining member removably secured to the wheel and adapted to engage the associated hub cap, anchor means such as a bolt or the like for holding the retaining member in operative position on the wheel, and a cover member removably fastened to the retaining member so as to conceal the anchor means and to prevent ready ascertainment of the precise nature thereof, e. g. of the configuration of the bolt head and, thereby, of the type of wrench, key or screwdriver required to loosen the hub cap. The cover member or lid itself, will be held onto the retaining member by fastening means which may in turn take a variety of forms so as to discourage unauthorized removal. The lid and the retaining member together advantageously form a watertight shell protecting the anchor means from adverse atmospheric influences.

The retaining member preferably co-operates with abutment means located at a diametrically opposite portion of the wheel and assisting in holding the hub cap in place. The said abutment means may comprise one or more projections punched out of the wheel felly during manufacture yet the same may also take the form of a distinct element so secured to the wheel rim as to form a projection thereon. Preferably, this element is of such weight as to counterbalance the locking device mounted on the diametrically opposite side of the wheel. A removable element of this description may, according to another feature of the invention, comprise a strip of magnetic material removably engaging the rim of the wheel when the device is in use.

The above and other objects and features of the invention will become more fully apparent from the following description of certain embodiments, reference being had to the accompanying drawing in which:

Fig. 1 is an elevation of a wheel with hub cap and tire, equipped with a locking device according to my invention;

Fig. 2 is an axial section of the wheel (with the tire removed) taken on the line 2—2 of Fig. 1;

Fig. 3 is an exploded plan view, partly in section, of a locking device according to my invention;

Fig. 4 is a sectional plan view of an assembled locking device of somewhat modified construction;

Fig. 5 is an elevation of the device of Fig. 4 with part of the lid broken away;

Fig. 6 is an elevation of a magnetic abutment member according to my invention;

Fig. 7 is a section on the line 7—7 of Fig. 6; and

Fig. 8 is a view similar to Fig. 6, showing a modified form of abutment means.

Reference will first be made to Figs. 1 and 2 which show a conventional wheel 10 equipped (in Fig. 1) with a tire 11. The wheel 10 comprises a felly or rim portion 12 surrounding a web member 13 whose central opening 14 serves to receive the car axle (not shown). A hub cap 15 overlies the web 13 and engages the felly 12 by means of resilient teeth 16 formed in its periphery.

The felly 12 and the web 13 are provided with approximately aligned apertures or holes 17, 18, the latter registering with a hole 19 in the hub cap 15; the holes 17, 18, 19 serve to receive the nipple 20 for admitting air into the tire 11. Diametrically opposite the hole 19 I provide the hub cap with a similar hole 22 through which passes the retaining part of a locking device 23 anchored to the web 13; associated with the device 23 is an abutment 24 which projects inwardly from the felly 12, near the hole 17, and is engaged by one or more of the teeth 16 of the cap 15. The nature of the device 23 and of the abutment 24 is more fully illustrated in Figs. 3–5 and 6–8, respectively.

Fig. 3 shows a locking device 123 according to my invention, comprising two main parts 125, 126 normally held together by a bored and inwardly threaded stem 127, bolts 128, 129 and a nut 130 to form a substantially watertight shell. The lower shell portion 126 (as viewed in Fig. 3) represents the retaining member of my device and widens at the top to overlie the hole 22 of the cap 15; it is formed internally with a recess 131 accommodating the head 132 of stem 127 whose larger, lower bore 133 mates with the bolt 128. The bolt 128, in turn, passes through the suitably apertured web 13 of the wheel and is secured thereto with the aid of the nut 130. When the stem 127 is screwed home on the bolt 128 and within the shell portion 126, it fastens the latter to the web 13 and thereby detachably secures the hub cap 15 to the wheel 10.

It will be observed that the head 132 is provided with a slot 134 adapted to receive a screwdriver, this being the only way in which the otherwise completely round stem 127 may be tightened or loosened on the bolt 128; stem 127 is preferably so dimensioned that the member 126 may turn freely around it, so that no amount of rotation of this member or of the entire shell 125, 126 will liberate the hub cap 15. The character of the head 132 and the slot 134 are, however, normally concealed by the upper shell portion or lid 125 whose threaded aperture 135 is engaged by the bolt 129; this bolt is further adapted to penetrate and to mate with the upper, narrower bore 136 of stem 127, thereby securing the lid 125 to the retaining member 126. The bolt 129 is here shown provided with a hexagonal head 137 and therefore requires, for its removal, a wrench or other suitable tool which, however, will be useless in any subsequent attempt at loosening the anchorage 127, 128.

When the device 123 is completely assembled, its members 125, 126 together with the nut 130 form a protective shell around the stem 127, thus preventing dust and rain water from attacking critical portions of the assembly. These members may be made of a variety of materials, preferably of plastic or aluminum, and could be colored to match the hub cap and/or the tire.

The device 223 of Figs. 4 and 5 differs from the device 123 in part by the fact that the bolt 229 in lid 225 is provided with a countersunk head 237 having a hexagonal recess 238, so as to be engageable only by an Allen-type wrench or equivalent tool of particular size, whereas the head 232 of stem 227 is of hexagonal configuration so as to enable the detachment of retaining member 226 only by the use of a different type of tool, e. g. a socket wrench. It will also be noted that the stem 227, instead of having a lower bore to receive a bolt from beneath, is provided with a depending, threaded stud 233 mating with a threaded bore 239 in a socket member 228; the latter is provided with a shoulder 240 soldered onto the web 13 at 241. The dimensions are again, preferably, such that the head 232 will sit only loosely upon the member 226 whereby the latter may rotate freely and ineffectively about the stem.

In Figs. 6 and 7 the abutment means 124 is seen to comprise an elongated metal strip curved to fit the inner periphery of the wheel felly 12 and provided with a pair of pins 142 which pass through corresponding holes in the wheel body. The strip 124 may be magnetized, as indicated, so as to cling to the ferrous wheel, thereby dispensing with the need for a forced fit between the pins 142 and the felly 12; it will be noted that when the strip 124 is engaged from below by a tooth 16 of the cap 15, this strip will be inaccessible from without and will thus be irremovable until the cap 15 has been lifted out of the wheel 10 at the diametrically opposite end, the latter operation being possible only after a detachment of the locking device 23 (123, 223) from the web 13. The weight of the strip 124 preferably is substantially equal to that of device 23 for dynamically counterbalancing the latter.

Fig. 8 shows a punched-out portion 224 of the felly 12 taking the place of the strip 124 (Figs. 6, 7) and serving as an abutment for the teeth 16. Again it will not be possible to pry the left-hand portion of the cap 15 from the wheel 10 until after the right-hand portion of the cap has been liberated by a detachment of the device 23.

It will be appreciated that abutment means 124, 224 or their equivalents may be used with any type of locking device 23, e. g. the specific embodiments shown in Figs. 4–6 or any modification thereof. Such modifications, as will be readily understood, may be produced by providing the bolts 129, 229 and the stems 127, 227 with different combinations of slotted, recessed and/or polygonal heads, the arrangement being preferably such that no single tool will fit both the outer bolt and the inner stem of a given device. Whether a permanently attached socket or base is provided, as illustrated in Fig. 4, or whether the same is to be screwed or otherwise removably fastened onto the wheel 10, as in Fig. 3, will depend in part on whether the device is installed at the factory or is subsequently furnished; similar considerations may determine the use of a punched-out rim, as in Fig. 8, or of detachable abutment means, as in Figs. 6 and 7.

The invention is, accordingly, not limited to the specific embodiments described and illustrated but is capable of numerous modifications and adaptations without departing from the spirit and scope of the appended claims.

I claim:

1. An anti-theft device for automobile hub caps, comprising a retaining member adapted to engage a hub cap while passing through a hole therein, anchor means adapted to be secured to a wheel portion underlying said hub cap, a detachable terminal member co-operating with said anchor means and positioned inside said retaining member and securing the latter to said anchor means, said terminal member being operable by a tool to release said retaining member from said anchor means, a lid member engaging said retaining member and covering said terminal member, and fastening means accessible from without and removably securing said lid member to said retaining member, thereby rendering said terminal member inaccessible.

2. A device according to claim 1 wherein said lid member is opaque so as to conceal the shape of said terminal member.

3. A device according to claim 1 wherein said terminal member and said fastening means each comprises a head engageable by different types of tools only.

4. A device according to claim 3 wherein one of said heads is shaped for engagement by a socket wrench.

5. A device according to claim 3 wherein one of said heads is shaped for engagement by a setscrew key.

6. A device according to claim 3 wherein one of said heads is shaped for engagement by a screwdriver.

7. A device according to claim 1 wherein said retaining member is provided with an axial bore and a recess larger than said bore at one end of the latter, said terminal member comprising a stem passing through said bore from said one end thereof and a head lodged in said recess and holding said retaining member in position with respect to said stem, said head resting loosely on said retaining member and enabling substantially unhindered rotation of said retaining member relative to said head.

8. A device according to claim 7 wherein said stem is provided with a tapped bore, said anchor means comprising a bolt screwed into said bore.

9. A device according to claim 7 wherein said stem is provided with a threaded stud, said anchor means comprising an internally threaded socket mating with said stud.

10. A device according to claim 1 wherein said retaining member and said lid member together form a substantially watertight, protective shell enclosing said terminal member.

11. A device according to claim 1 wherein said terminal member is provided with a tapped bore facing said lid member, said fastening means comprising a bolt traversing said lid member and screwed into said bore.

12. A device according to claim 11 wherein said lid member is also provided with a tapped bore through which said bolt is screwed.

References Cited in the file of this patent

UNITED STATES PATENTS

| | | |
|---|---|---|
| 2,076,789 | Le Jeune | Apr. 13, 1937 |
| 2,077,698 | Hurd | Apr. 20, 1937 |